(12) United States Patent
Paproth et al.

(10) Patent No.: US 9,896,050 B2
(45) Date of Patent: Feb. 20, 2018

(54) TRAY ELEMENT FOR A MOTOR VEHICLE AND ARRANGEMENT OF A BATTERY ON A TRAY ELEMENT OF THIS TYPE

(71) Applicant: Bayerische Motoren Werke Aktiengesellschaft, Munich (DE)

(72) Inventors: Clemens Paproth, Munich (DE); Matthias Jaeger, Meuselwitz (DE); Peter Hirsch, Freising (DE); Helmut Gottmann, Hohenthann / Schmatzhausen (DE)

(73) Assignee: Bayerische Mortoren Weke Aktiengesellschaft, Munich (DE)

( * ) Notice: Subject to any disclaimer, the term of this patent is extended or adjusted under 35 U.S.C. 154(b) by 0 days.

(21) Appl. No.: 14/959,144

(22) Filed: Dec. 4, 2015

(65) Prior Publication Data
US 2016/0082909 A1 Mar. 24, 2016

Related U.S. Application Data

(63) Continuation of application No. PCT/EP2014/061364, filed on Jun. 2, 2014.

(30) Foreign Application Priority Data

Jun. 5, 2013 (DE) .................. 10 2013 210 469

(51) Int. Cl.
*B60R 16/04* (2006.01)
*H01M 2/02* (2006.01)
*H01M 2/10* (2006.01)

(52) U.S. Cl.
CPC .......... *B60R 16/04* (2013.01); *H01M 2/0237* (2013.01); *H01M 2/1083* (2013.01); *H01M 2220/20* (2013.01)

(58) Field of Classification Search
CPC ... B60R 16/04; H01M 2/1083; H01M 2/0237; Y02E 60/12
See application file for complete search history.

(56) References Cited

U.S. PATENT DOCUMENTS 5,004,129 A * 4/1991 Loch ................. H01M 2/02
                                                206/703
8,011,467 B2 * 9/2011 Asao ................. B60K 1/04
                                                180/68.5

(Continued)

FOREIGN PATENT DOCUMENTS

DE        101 32 191 A1    1/2003
DE    10 2007 044 428 A1   3/2009

(Continued)

OTHER PUBLICATIONS

International Search Report (PCT/ISA/210) issued in PCT Application No. PCT/EP2014/061364 dated Aug. 1, 2014 with English-language translation (six (6) pages).

(Continued)

*Primary Examiner* — John Walters
*Assistant Examiner* — James Triggs
(74) *Attorney, Agent, or Firm* — Crowell & Moring LLP

(57) ABSTRACT

A tray element is provided for a motor vehicle. The tray element can be arranged in a stowage region of the motor vehicle and has at least one receiving tray open at the top in the vertical direction of the motor vehicle for at least partially receiving at least one battery (14) of the motor vehicle. The tray element is designed as a die-cast component made of a light metal.

13 Claims, 6 Drawing Sheets

(56) References Cited

U.S. PATENT DOCUMENTS

| | | | |
|---|---|---|---|
| 9,437,905 B2* | 9/2016 | Boddakayala | B60L 11/14 |
| 2004/0251858 A1 | 12/2004 | Asao et al. | |
| 2008/0163846 A1* | 7/2008 | Kurita | B22D 30/00 |
| | | | 123/195 R |
| 2012/0164504 A1* | 6/2012 | Takashina | B60K 6/48 |
| | | | 429/99 |

FOREIGN PATENT DOCUMENTS

| | | |
|---|---|---|
| DE | 10 2008 061 515 A1 | 6/2010 |
| DE | 10 2010 055 960 A1 | 8/2011 |
| EP | 1 260 427 A2 | 11/2002 |
| EP | 1 479 567 A1 | 11/2004 |
| JP | 2012-138205 A | 7/2012 |
| WO | WO 99/36974 A1 | 7/1999 |
| WO | WO 03/007402 A1 | 1/2003 |

OTHER PUBLICATIONS

German Search Report issued in counterpart German Application No. 10 2013 210 469.3 dated Feb. 19, 2014 with partial English-language translation (ten (10) pages).

* cited by examiner

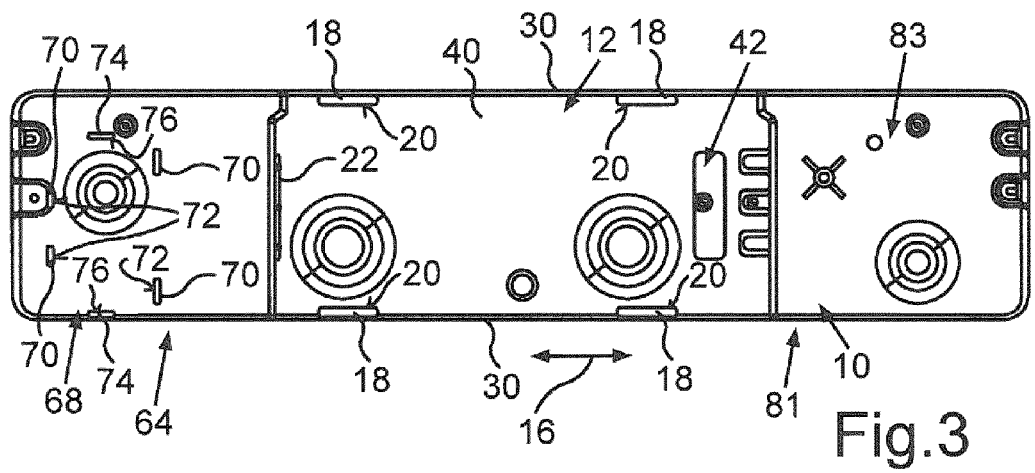
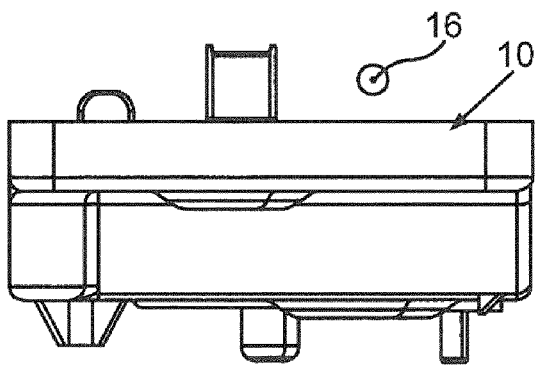

TRAY ELEMENT FOR A MOTOR VEHICLE AND ARRANGEMENT OF A BATTERY ON A TRAY ELEMENT OF THIS TYPE

CROSS REFERENCE TO RELATED APPLICATIONS

This application is a continuation of PCT International Application No. PCT/EP2014/061364, filed Jun. 2, 2014, which claims priority under 35 U.S.C. § 119 from German Patent Application No. 10 2013 210 469.3, filed Jun. 5, 2013, the entire disclosures of which are herein expressly incorporated by reference.

BACKGROUND AND SUMMARY OF THE INVENTION

The invention relates to a tray element for a motor vehicle, in particular a passenger motor vehicle, and to an arrangement of a battery on such a tray element of this sort.

A tray element of this type and an arrangement of this type of a battery on a tray element for a motor vehicle is known from DE 10 2007 044 428 A1. Here, the tray element has at least one receiving recess which is open at the top in the vehicle vertical direction and in which at least one battery of the motor vehicle can be received or is received at least partially. Here, the tray element is configured as a plastic injection-molded part, at least one integrated hollow profile being provided in order to increase the stiffness. The hollow profile is shaped out by way of an injection process. This leads to a high number of parts and to a high weight of the tray element.

It is therefore an object of the present invention to develop a tray element and an arrangement of the type mentioned at the outset in such a way that a particularly low weight of the tray element can be realized in an inexpensive way.

This object is achieved by way of a tray element and by way of an arrangement according to embodiments of the invention.

A first aspect of the invention relates to a tray element for a motor vehicle, in particular a passenger motor vehicle. The tray element can be arranged in a loading or stowage space region of the motor vehicle and has at least one receiving recess which is open at the top in the vehicle vertical direction for at least partially receiving at least one battery of the motor vehicle.

In order for it to be possible to realize a particularly low weight of the tray element in an inexpensive way, it is provided according to the invention that the tray element is configured as a high-pressure die cast component made from a lightweight metal. The term "lightweight metal" is also to be understood to mean a corresponding lightweight metal alloy, from which the tray element is formed. The lightweight metal or the lightweight metal alloy is preferably aluminum or an aluminum alloy, by means of which a particularly low weight of the tray element can be realized.

As a consequence of the configuration of the tray element as a high-pressure die cast component made from the lightweight metal, small wall thicknesses and complex geometries can also be produced in a simple, rapid and inexpensive way, with the result that firstly the weight of the tray element can be kept particularly low and, secondly, high stiffness of the tray element can be achieved. It is possible, in particular, for high stiffness of the tray element to be capable of being realized without additional stiffening elements which are configured separately from the tray element.

The tray element is usually also called a tub, in particular a luggage compartment tub, since the tray element is of at least substantially tub-shaped configuration at least in the region of its receiving recess, it being possible for the battery to be received at least partially in the tub-shaped region.

In order to realize particularly simple, inexpensive and low-weight fastening of the battery to the tray element, it is provided in one particularly advantageous embodiment of the invention that the single-piece tray element has at least one fastening element for fastening the battery to the tray element. In other words, the at least one fastening element is integrated into the tray element, with the result that the at least one fastening element is configured in one piece with the remaining tray element. As a result, additional fastening elements which are configured separately from the tray element for fastening the battery to the tray element can be avoided. As an alternative, the number of fastening elements separate from the tray element for fastening the battery to the tray element can be kept particularly low, with the result that the battery can be fastened to the tray element with an only very small number of parts and therefore in an inexpensive and low-weight manner.

A second aspect of the invention relates to an arrangement of a battery on a tray element for a motor vehicle, in particular a passenger motor vehicle. In the arrangement, the tray element has at least one receiving recess which is open at the top in the vehicle vertical direction and in which the battery is received at least partially.

In order to realize a particularly low weight of the tray element in a particularly inexpensive way, it is provided according to the invention that the tray element is configured as a high-pressure die cast component made from a lightweight metal. Particularly high stiffness can also be provided as a result. Advantageous refinements of the first aspect of the invention are to be considered to be advantageous refinements of the second aspect of the invention and vice versa.

In the arrangement according to the invention, not only high stiffness and a low weight of the tray element itself can be realized. Rather, the entire arrangement has high stiffness and stability, since the battery can be fastened in a particularly fixed and stiff manner to the tray element and via the latter to a superstructure, in particular the vehicle body, of the motor vehicle.

A particularly stiff and lightweight attachment of the battery can be realized by virtue of the fact that the tray element is configured in one piece and has at least one fastening element, by which the battery is fastened to the tray element. In other words, the fastening element is integrated into the tray element, with the result that additional fastening elements which are configured separately from the tray element for fastening the battery to the tray element can be avoided or the quantity thereof can be kept low.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 3 is a diagrammatic plan (top) view of the tray element;

FIG. 4 is a diagrammatic side view of the tray element;

DETAILED DESCRIPTION OF THE DRAWINGS

Figure 1:
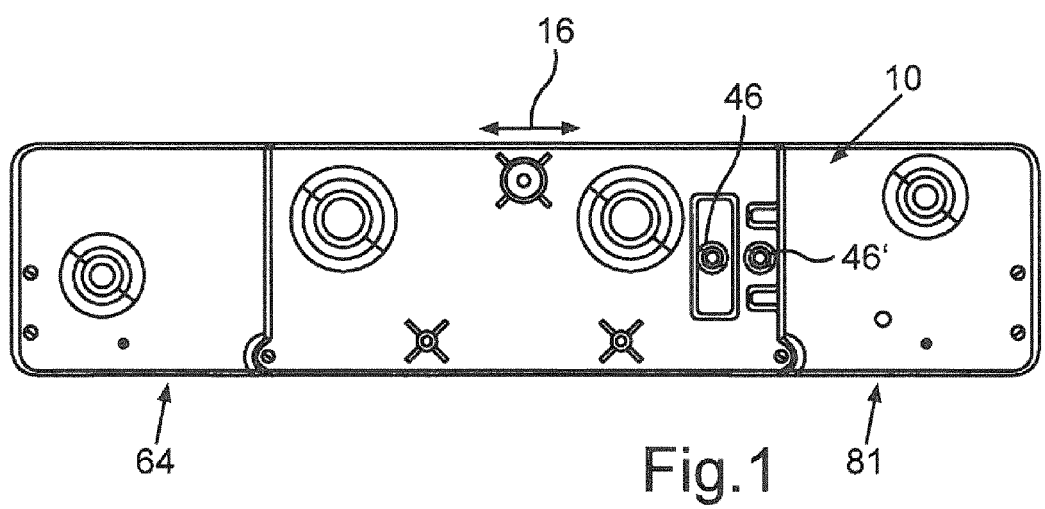
FIG. 1 is a diagrammatic bottom view of a tray element for a passenger motor vehicle, which tray element can be arranged in a loading space region of the motor vehicle and has at least one receiving recess which is open at the top in the vehicle vertical direction for at least partially receiving at least one battery of the motor vehicle, the tray element being configured as a high-pressure die cast component made from aluminum or an aluminum alloy.
Figure 2:
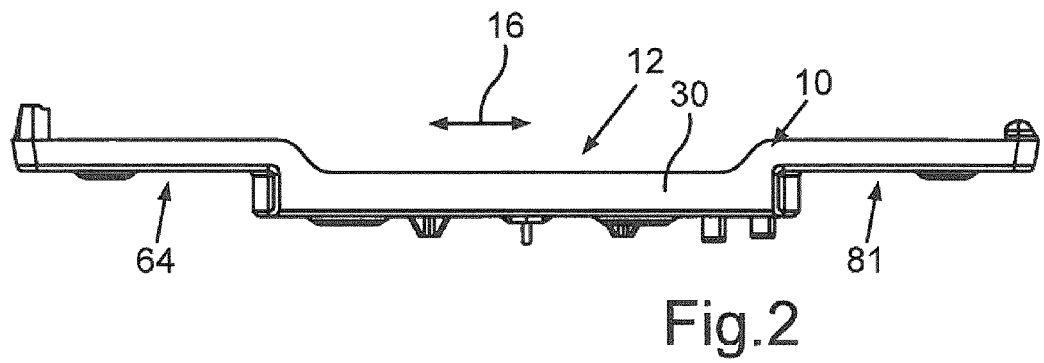
FIG. 2 is a diagrammatic front view of the tray element.

In the figures, identical or functionally identical elements are provided with identical designations.

FIGS. 1 to 4 show a tray element (denoted in its entirety by 10) for a passenger motor vehicle. The tray element 10 can be arranged in a loading space region, for example in a luggage compartment, of the passenger motor vehicle and has a receiving recess 12. The recess 12 is open at the top in the vehicle vertical direction in relation to an installed state of the tray element 10. In the installed state the tray element 10 is fastened to the vehicle body of the passenger motor vehicle. As can be seen from viewing FIGS. 1 and 6 together, the receiving recess 12 serves for at least partially receiving a battery 14, the battery 14 being shown in FIG. 6 according to a first embodiment.

In order to fasten the battery 14 to the tray element 10, the battery 14 is inserted from above in the vehicle vertical direction into the receiving recess 12 and is fastened to the tray element 10, as will be explained below.

In order to realize a particularly low weight and, at the same time, particularly high stiffness of the tray element 10, the tray element 10 is configured as a high-pressure die cast component made from a lightweight metal. The lightweight metal is aluminum or an aluminum alloy. In other words, the tray element 10 is manufactured from aluminum or an aluminum alloy by way of a high-pressure die casting process. As a result, sufficient stiffness of the tray element 10 can be realized without additional stiffening elements. As a consequence, the number of parts and, therefore, the weight of the tray element 10 can be kept particularly low.

After its manufacture, for example, the tray element 10 is connected to the vehicle body by the tray element 10 being riveted, for example, to the vehicle body, that is to say being fastened to the vehicle body by means of rivets. The tray element 10 has a longitudinal extent direction which is illustrated by way of a directional arrow 16. In relation to the installed state, the longitudinal extent direction of the tray element 10 coincides with the vehicle transverse direction.

As can be seen from the top view of FIG. 3, the tray element 10 has stop elements 18 with respective bearing faces 20 in its receiving recess 12. In its state in which it is arranged in the receiving recess 12, the battery 14 can be supported on the bearing faces 20 in the vehicle longitudinal direction. This means that centering or positioning of the battery 14 in the vehicle longitudinal direction is provided by way of the bearing faces 20. Here, the stop elements 18 are integrated into the tray element 10. In other words, the tray element 10 is configured in one piece. This means that the stop elements 18 are configured in one piece with the remaining tray element 10. Additional elements which are separate from the tray element 10 for centering the battery 14 in the vehicle longitudinal direction are therefore not provided and are not required.

Figure 5:
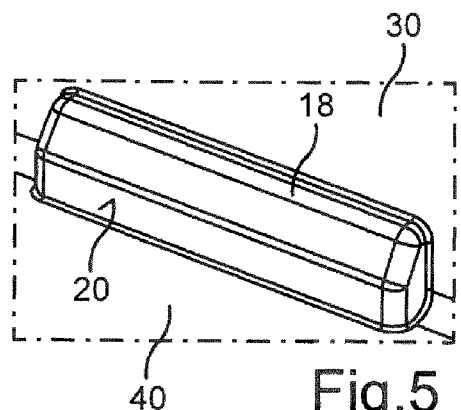
FIG. 5 illustrates details of a diagrammatic perspective view of the tray element.

FIG. 5 shows one of the stop elements 18 in a plan view, which stop element is representative of all the stop elements 18.

Figure 6:
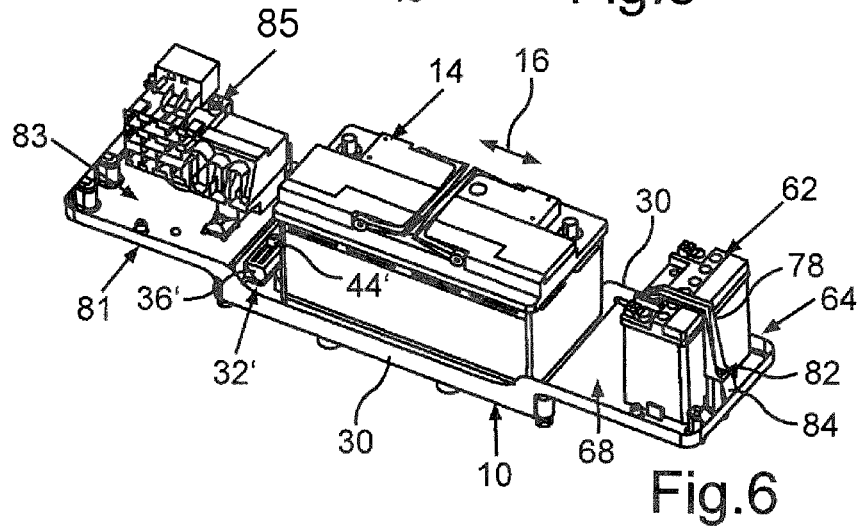
FIG. 6 is a diagrammatic and perspective plan view of an arrangement of a battery according to a first embodiment on the tray element.
Figure 7:
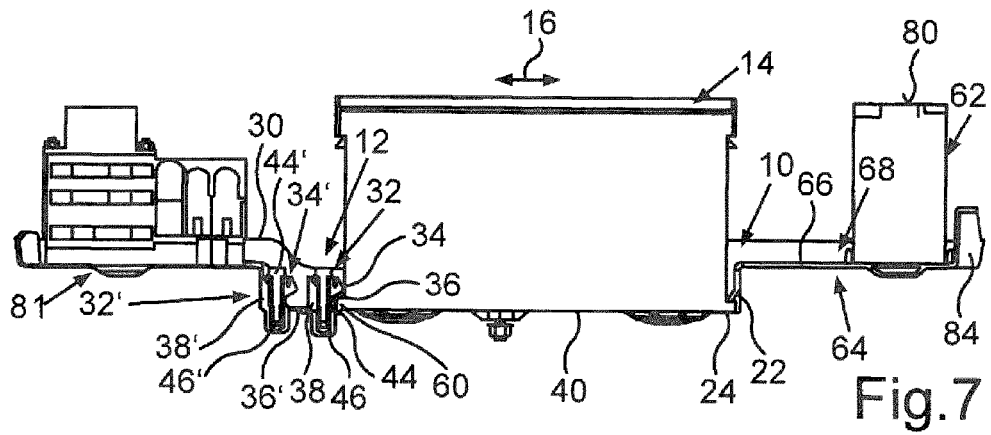
FIG. 7 is a diagrammatic longitudinal sectional view of the arrangement according to FIG. 6.

FIG. 6 shows a diagrammatic and perspective plan view of an arrangement of the battery 14 according to the first embodiment on the tray element 10. As can be seen particularly clearly from FIGS. 3 and 7, a fastening element in the form of a clamping strip 22 is integrated into the tray element 10. This means that the single-piece tray element 10 has the clamping strip 22 which serves to fasten the battery 14 to the tray element 10. In relation to the installed state, the clamping strip 22 extends in the vehicle longitudinal direction at least over a predominant part of an extent of the receiving recess 12, which extent runs in the vehicle longitudinal direction. Here, the clamping strip 22 is configured as a positively locking element, by means of which a corresponding, battery-side fastening element in the form of a clamping base 24 of the battery 14 can be covered at the top in the vehicle vertical direction or is covered in the arrangement. During fastening of the battery 14 to the tray element 10, the battery 14 is inserted into the receiving recess 12 in such a way that the clamping base 24 is pushed or plugged under the clamping strip 22.

The integration of the clamping strip 22 into the tray element 10 which is configured as a high-pressure die cast component takes place, for example, by means of at least one slide of a movable mold half which is used to produce the tray element 10 during the high pressure die casting process. As a result of said integration, additional fastening elements which are configured separately from the tray element 10 for fastening the battery 14 to the tray element 10 can be avoided or the quantity thereof can be kept low. The number of parts and the weight of the arrangement overall can therefore be kept low. Furthermore, the number of required connecting techniques can be kept low, and the battery 14 can be fastened to the tray element 10 in a particularly short time. Moreover, the arrangement has a very low installation space requirement. Furthermore, forces which act on the battery 14 can be introduced particularly well from the battery 14 into the tray element 10, since an introduction of force of this type can take place via the integrated clamping strip 22 directly into the high-pressure die cast component.

Figure 9:
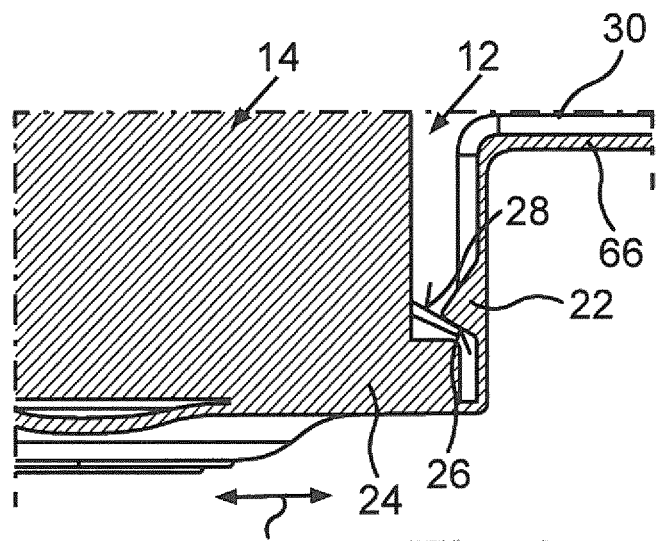
FIG. 9 illustrates details of a further diagrammatic longitudinal sectional view of the arrangement according to FIG. 6.

As can be seen particularly clearly from FIG. 9, respective supporting faces 26, 28 of the clamping strip 22 and the clamping base 24 run obliquely with respect to the vehicle vertical direction and from top left to bottom right in relation to the plane of the image of FIG. 9, with the result that the clamping strip 22 and the clamping base 24 interact in a wedge-like manner. If the battery 14 is pressed in the direction of the clamping strip 22 relative to the tray element 10, an increase in a clamping force which runs in the vehicle vertical direction is brought about as a result on account of the wedge-like configuration of the supporting faces 26, 28 which are situated in mutual supporting contact in the state of the battery 14 in which it is fastened to the tray element 10. By way of the clamping force, the battery 14 is clamped fixedly on the tray element 10 in the arrangement and, as a result, is fixed in the vehicle vertical direction on the tray element 10 and, therefore, on the passenger motor vehicle overall.

Fixing of the battery 14 in the vehicle longitudinal direction is ensured by way of the receiving recess 12 and, in particular, by way of the stop elements 18 on walls 30 (FIG. 3) of the receiving recess 12. Fixing of the battery 14 to the right in the vehicle transverse direction in relation to the plane of the image of FIG. 9 is ensured by way of the receiving recess 12 and, in particular, the clamping strip 22. Fixing of the battery 14 according to the first embodiment on a side which lies opposite the integrated clamping strip 22 is realized by way of a fastening device 32. The fastening device 32 includes a clamping rail which is denoted in its entirety by 34 and has an upper part 36 and a lower part 38 which corresponds with the latter. Here, the upper part 36 and the lower part 38 are configured separately from one another and separately from the tray element 10.

Figure 8:
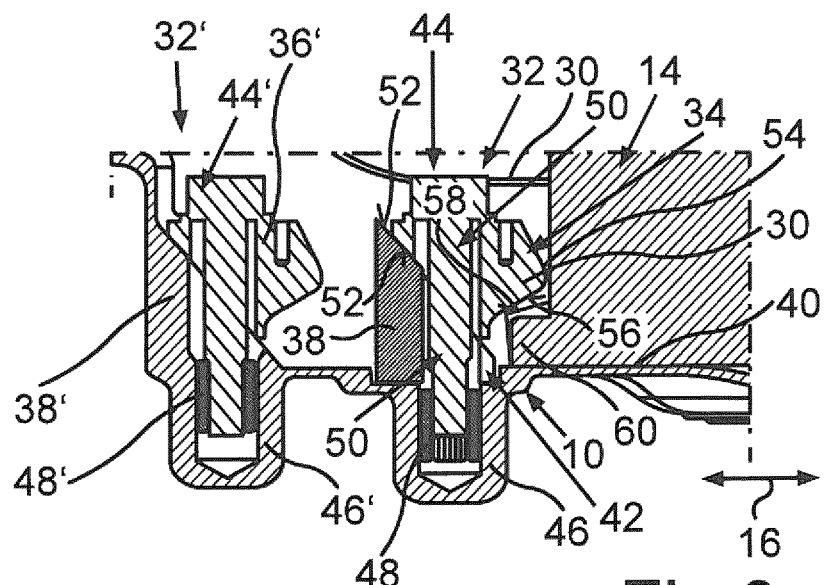
FIG. 8 illustrates details of a further diagrammatic longitudinal sectional view of the arrangement according to FIG. 6.

It can be seen in FIG. 8 that the tray element 10 has a cutout 42 for the lower part 38 on its bottom 40. The cutout 42 is therefore a recess or a receptacle for the lower part 38, with the result that the lower part 38 is fixed in a positively locking manner on the tray element 10 in the vehicle transverse direction and in the vehicle longitudinal direction. In other words, the lower part 38 can be supported in the vehicle transverse direction and in the vehicle longitudinal direction on walls of the tray element 10 which delimit the cutout 42. A particularly advantageous and direct introduction of force into the cast component can be realized by way of the fixing or support of the lower part 38 on the tray element 10.

At least one screw element in the form of a screw 44 is provided for fastening the clamping rail 34 to the tray element 10. The screw 44 is connected via a screw boss 46 of the tray element 10 to the latter. There is a screw element 48 in the screw boss 46, which screw element 48 corresponds with the screw 44 and to which the screw 44 can be screwed or into which the screw 44 can be screwed, in order, as a result, to fasten the screw 44 and, by means thereof, the clamping rail 34 to the tray element 10.

If the battery 14 is inserted into the receiving recess 12, with the result that the clamping base 24 is situated below the clamping strip 22, the upper part 36, for example, is placed onto the lower part 38, and the screw 44 is plugged through corresponding through openings 50 of the upper part 36 and the lower part 38 and is screwed to the screw element 48 and, via this, to the tray element 10. The upper part 36 and the lower part 38 have respective supporting faces 52 which run obliquely with respect to the vehicle vertical direction in the installed state and are therefore of wedge-shaped configuration or interact in a similar manner to the supporting faces 26, 28. During tightening of the screw 44, the upper part 36 can slide on the lower part 38 and therefore move in the direction of the bottom 40.

In order to clamp the battery 14 fixedly on the tray element 10 as a result, the upper part 36 has a clamping lug 54 which interacts via a supporting face 56 with a supporting face 58 of a clamping base 60 of the battery 14. Here, the supporting faces 56, 58 also run obliquely with respect to the vehicle vertical direction, with the result that they are configured or interact in a wedge-shaped or wedge-like manner. On the side which lies opposite the integrated clamping strip 22, the battery 14 is therefore secured at the top in the vehicle vertical direction and to the left in the vehicle transverse direction in relation to the planes of the images of FIGS. 8 and 9 by way of clamping or fixed clamping. The clamping rail 34 of the fastening device 32 is configured separately from the tray element 10 here.

Figure 10:
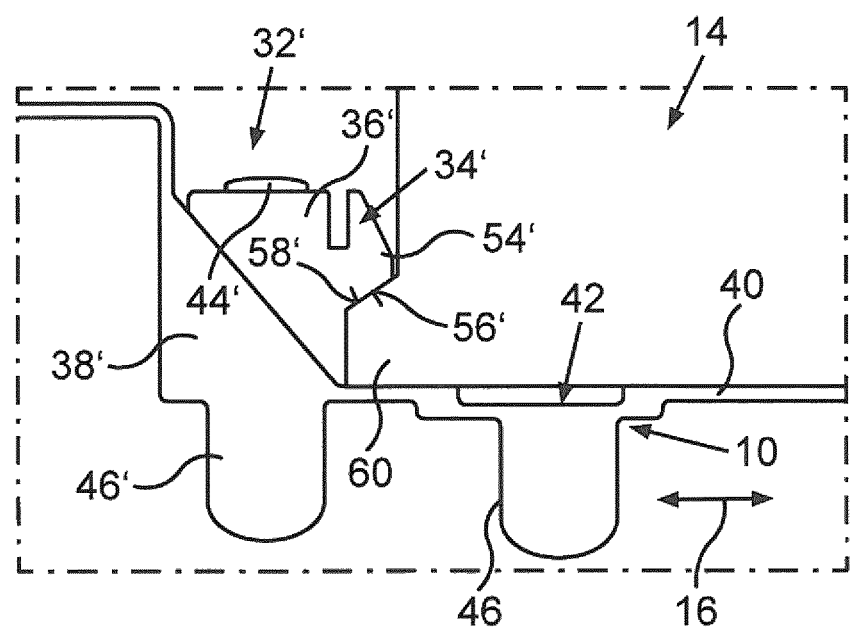
FIG. 10 illustrates details of a diagrammatic sectional view of an arrangement of the battery according to a second embodiment on the tray element.

FIG. 10 shows details of an arrangement of the battery 14 according to a second embodiment on the tray element 10. The battery 14 according to the second embodiment has a greater extent running in the vehicle transverse direction in relation to the installed state than the battery 14 according to the first embodiment. These different extents are caused, for example, by different storage capacities. The battery 14 according to the first embodiment has, for example, a lower storage capacity than the battery 14 according to the second embodiment. For example, the battery 14 according to the first embodiment has a storage capacity of 90 ampere hours (Ah), the battery 14 according to the second embodiment having a storage capacity of 105 ampere hours.

As can be seen from FIG. 10, the battery 14 according to the second embodiment is fastened on the side which lies opposite the integrated clamping strip 22 by way of a fastening device 32' which corresponds at least in terms of its function to the fastening device 32. The fastening device 32' includes a clamping rail 34' with an upper part 36' and a lower part 38'. The upper part 36' according to FIG. 10 can readily be the upper part 36 according to FIG. 8, by means of which the battery 14 according to the first embodiment is fastened to the tray element 10.

The lower part 38' according to FIG. 10 is then integrated into the tray element 10, however. The clamping rail 34' according to FIG. 10 is therefore partially integrated into the tray element 10, since it is now not the upper part 36' and the lower part 38', but rather merely the upper part 36' which is configured separately from the tray element 10. By virtue of the fact that the lower part 38' is integrated into the tray element 10, a direct introduction of force can take place from the upper part 36' into the lower part 38' and therefore into the high-pressure die cast component.

The functional principle of the fastening device 32', in particular of the clamping rail 34', can correspond completely to the functional principle of the fastening device 32 and the clamping rail 34, as can be seen particularly clearly from FIG. 8. A screw 44' which is screwed into a corresponding screw element 48' is provided for fastening the upper part 36' to the lower part 38' and therefore to the tray element 10. Here, the screw element 48' is received in a screw boss 46' of the tray element 10 and, for example, is screwed into the latter and/or is fastened in another way. The upper part 36' also has a clamping lug 54' with a supporting face 56' which interacts with a corresponding supporting face 58' of the clamping base 60 of the battery 14 according to the second embodiment. The explanations with respect to the supporting faces 56, 58 can also be readily transferred correspondingly to the supporting faces 56' and 58'. By way of the partial integration of the clamping rail 34' into the tray element 10, the number of parts and therefore the weight of the arrangement can be kept particularly low.

The respective screw element 48, 48' is a threaded insert. The use of a threaded insert of this type can avoid a situation where the respective screw 44, 44' is screwed directly into the tray element 10 which is configured as a cast component. The respective screw 44, 44' can therefore be released and retightened particularly often.

As an alternative to the use of the respective screw element 48, 48', via which the respectively corresponding screw 44, 44' is screwed indirectly to the tray element 10, it is possible to use self-tapping screws as the screws 44, 44'. Self-tapping screws of this type are usually also called thread-cutting screws. This means that the respective screw 44, 44' has a thread, an external thread in the present case, by means of which a corresponding counter-thread, an internal thread in the present case, is formed in or cut into the respective screw boss 46, 46' when the respective screw 44, 44' is screwed to a corresponding component, in the present case to the tray element 10. In other words, if the respective screw 44, 44' is screwed into the respective screw boss 46, 46', the formation of an internal thread in the screw boss 46, 46' therefore happens at the same time.

Since the production of a respective internal thread in the corresponding screw boss 46, 46' happens at the same time as the screw element 48 or 48' is screwed in, it is not necessary to produce an internal thread on the respective screw boss 46' before the respective screw 44, 44' is screwed in.

The screws 44, 44' can therefore be screwed directly into the tray element 10 or into the respective screw boss 46, 46', without the tray element 10 or the respective screw boss 46, 46' already having a thread, in particular an internal thread, before they are screwed in.

Figure 11:
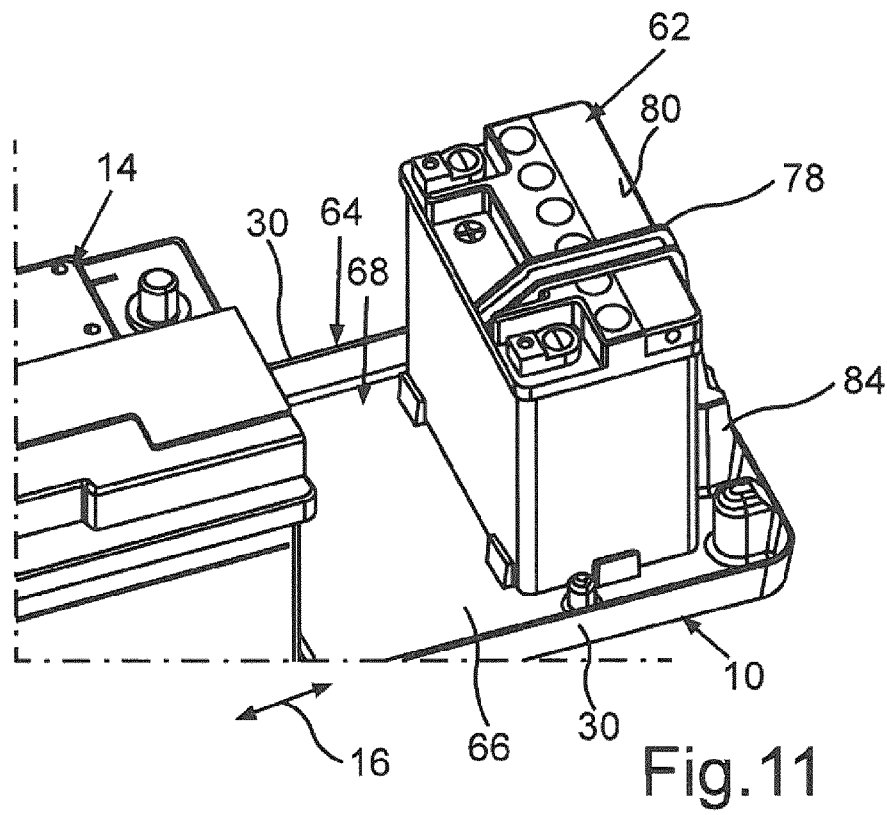
FIG. 11 illustrates details of a further diagrammatic and perspective plan view of the arrangement according to FIG. 6.
Figure 12:
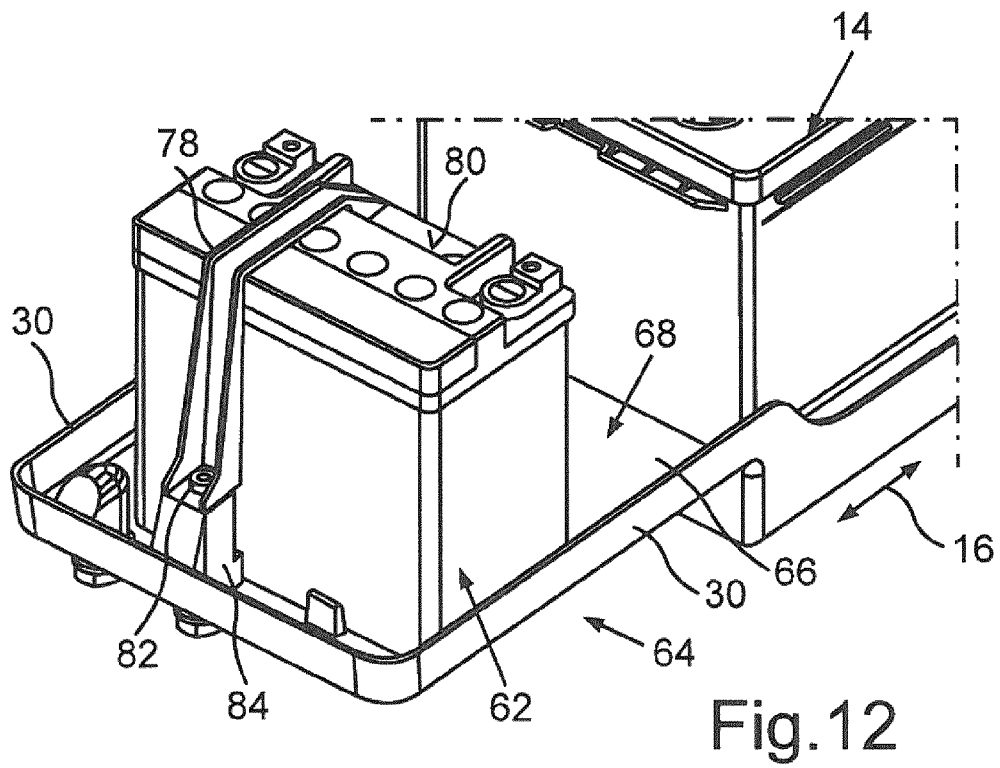
FIG. 12 illustrates details of a further diagrammatic and perspective plan view of the arrangement according to FIG. 6.

As can be seen from FIG. 6 and particularly clearly from FIGS. 11 and 12, a second battery 62 which is configured separately from the battery 14 and is provided in addition to the battery 14 is fastened to the tray element 10 in the arrangement. In the longitudinal extent direction of the tray element 10, a side part 64 of the tray element 10 extends away from the receiving recess 12, the bottom 66 of which side part 64 is arranged at a different, higher level in the vehicle vertical direction in comparison with the bottom 40 of the receiving recess 12. The respective, front and rear wall 30 of the receiving recess 12 also extends as far as the side part 64, with the result that the side part 64 has a tray-shaped or tub-shaped receptacle 68, in which the battery 62 is partially received. The battery 62 serves to extend the on-board power network of the passenger motor vehicle. The on-board power network has, for example, a voltage of 24 volts. In order to fix the battery 62 on the tray element 10 in the vehicle transverse direction, stop elements 70 (FIG. 3) are provided which have respective bearing faces 72. In its installed state, the battery 62 bears in a supported manner against the bearing faces 72. Moreover, the side part 64 of the single-piece tray element 10 has stop elements 74 with bearing faces 76 for fixing or supporting the battery 62 in the vehicle longitudinal direction.

In order also to fix the battery 62 at the top in the vehicle vertical direction on the tray element 10 or on the side part 64 which is configured in one piece with the receiving recess 12, a holder 78 is provided which is configured separately from the tray element 10 and is manufactured, for example, from a plastic material. The holder 78 engages around the battery 62 at least partially. In particular, the holder 78 is arranged on an upper side 80 of the battery 62, which upper side faces away from the bottom 66, and is supported on the upper side 80. The result is that the holder 78 holds the battery 62 against the bottom 66 of the receptacle 68.

The holder 78 itself is fastened to the tray element 10 by use of a screw 82. The screw 82 is preferably a self-tapping or thread-cutting screw, with the result that a thread, in particular an internal thread, which corresponds with a thread, in particular an external thread, of the screw 82 is formed when the screw 82 is screwed fixedly on the tray element 10. The screw 82 is preferably screwed directly into the high-pressure die cast component, with the result that a thread, in particular an internal thread, which corresponds with its thread, in particular its external thread, is formed by way of the thread on the tray element 10 or on the side part 64 only when the screw 82 is screwed into the tray element 10. To this end, the tray element 10 has a screw boss 84, into which the screw 82 is screwed. Particularly satisfactory counter-support in the vehicle vertical direction can be realized by means of the holder 78, with the result that the battery 62 is fixed particularly firmly on the tray element 10.

As can be seen particularly clearly from FIGS. 1 to 4, 6 and 7, the tray element 10 has a second side part 81 on a side which lies opposite the side part 64. The side part 81 is likewise of tub-like or tub-shaped or tray-like or tray-shaped configuration and has a tub-shaped or tray-shaped receptacle 83. Here, the second side part 81 serves to receive a further component 85, this being, for example, an electronic component of the motor vehicle.

The tray element 10 preferably has at least one attaching device preferably with at least two attaching elements. In each case one stiffening strut on the tray element or on the tray element 10 can be fixed on the attaching elements. The stiffening struts are preferably stiffening struts which run obliquely with respect to one another and obliquely with respect to the vehicle longitudinal direction below the vehicle floor of the passenger motor vehicle and serve to stiffen the vehicle body of the passenger motor vehicle. Stiffening struts of this type are, for example, torsional struts or thrust rods.

LIST OF DESIGNATIONS

10 Tray element
12 Receiving recess
14 Battery
16 Directional arrow
18 Stop elements
20 Bearing face
22 Clamping strip
24 Clamping base
26 Supporting face
28 Supporting face
30 Walls
32, 32' Fastening device
34, 34' Clamping rail
36, 36' Upper part
38, 38' Lower part
40 Bottom
42 Cutout
44, 44' Screw
46, 46' Screw boss
48, 48' Screw element
50 Through openings
52 Supporting faces
54, 54' Clamping lug
56, 56' Supporting face
58, 58' Supporting face
60 Clamping base
62 Second battery
64 Side part
66 Bottom
68 Receptacle
70 Stop elements
72 Bearing faces
74 Stop elements
76 Bearing faces 78 Holder
80 Upper side
81 Side part
82 Screw
83 Receptacle
84 Screw boss
85 Further component The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A component for a motor vehicle, comprising:
a high-pressure die cast light weight metal tray element configured to be arranged in a loading space region of the motor vehicle, wherein
the tray element has at least one receiving recess open toward a top in a vertical direction of the motor vehicle, and
the at least one receiving recess is configured to receive at least one battery of the motor vehicle, wherein
the high-pressure die cast light weight metal tray element is formed in a single piece and comprises at least one fastening element configured to fasten the battery to the tray element, and
the fastening element is configured as a positively locking element by which a top side of a corresponding battery-side fastening element is covered in the vertical direction of the motor vehicle.

2. The component according to claim 1, wherein the tray element is an aluminum tray element.

3. An arrangement for a motor vehicle, the arrangement comprising:
the component according to claim 1; and
a battery, wherein
the battery is arranged in the at least one receiving recess of the tray element.

4. The arrangement according to claim 3, wherein the battery is clamped fixedly on the tray element.

5. A component for a motor vehicle, comprising:
a high-pressure die cast light weight metal tray element configured to be arranged in a loading space region of the motor vehicle, wherein
the tray element has at least one receiving recess open toward a top in a vertical direction of the motor vehicle,
the at least one receiving recess is configured to receive at least one battery of the motor vehicle,
the tray element includes at least one attaching device with at least two attaching elements,
a stiffening strut is fixed on each of the at least two attaching elements, and
the stiffening struts run obliquely with respect to one another and being oblique with respect to the vehicle longitudinal direction below the vehicle floor of the passenger motor vehicle so as to stiffen the vehicle body of the passenger motor vehicle.

6. The component according to claim 5, wherein the stiffening struts are torsion struts.

7. The component according to claim 5, wherein the stiffening struts are thrust struts.

8. The component according to claim 7, wherein the at least one receiving recess has at least one fastening element for fastening the battery thereto.

9. The component according to claim 8, wherein the at least one fastening element is a form-locking element, by means of which a corresponding fastening-side element in the direction of the vehicle is coverable from above.

10. The component according to claim 9, wherein the high-pressure die cast light weight metal is aluminum.

11. A passenger car comprising:
a well element that is arrangeable in a stowage-space region of the passenger car and that has at least one receiving well which is open upwards in a vertical direction of the passenger car for at least partially receiving at least one battery of the passenger car, wherein
the well element is formed as a die cast component from a lightweight metal, and
the well element has at least one attachment means with at least two attachment elements, with stiffening struts being fixed on the well element on the at least two attachment elements, the stiffening struts running obliquely to each other and obliquely to a longitudinal direction of the passenger car beneath a floor of the passenger car, and the stiffening struts bracing a body of the passenger car.

12. The passenger car according to claim 11, wherein the stiffening struts are torsion struts.

13. The passenger car according to claim 11, wherein the stiffening struts are thrust struts.

\* \* \* \* \*